United States Patent [19]

Rokutanda et al.

[11] Patent Number: 4,550,369
[45] Date of Patent: Oct. 29, 1985

[54] APPARATUS AND METHOD FOR PROCESSING MACROINSTRUCTIONS AND MICROINSTRUCTIONS

[75] Inventors: Takashi Rokutanda, Tokyo; Hiroshi Nakamura, Tokorozawa, both of Japan

[73] Assignee: Tokyo Shibaura Denki Kabushiki Kaisha, Kawasaki, Japan

[21] Appl. No.: 495,614

[22] Filed: May 18, 1983

[30] Foreign Application Priority Data

May 21, 1982 [JP] Japan ................................. 57-85752

[51] Int. Cl.⁴ ........................ G06F 9/00; G06F 13/00
[52] U.S. Cl. ................................................... 364/200
[58] Field of Search ... 364/200 MS File, 900 MS File

[56] References Cited

U.S. PATENT DOCUMENTS 4,179,736 12/1979 Wilhite ............................... 364/200
4,225,922 9/1980 Porter ................................. 364/200
4,450,519 5/1984 Guttag et al. ....................... 364/200

Primary Examiner—James D. Thomas
Assistant Examiner—William G. Niessen
Attorney, Agent, or Firm—Cushman, Darby & Cushman

[57] ABSTRACT

An instruction processing apparatus is composed of a main memory for storing user instructions and an instruction control section with a control store addressed by a user instruction read out from the main memory. The main memory stores a high performance instruction with the same function as that of a set of low performance instructions, in addition to ordinary user instructions (low performance instructions). The instruction control section includes a first control store which is addressed by a high performance instruction from the main memory and stores a first microprogram with the same format and function as those of a set of the low performance instructions to form a high performance instruction, and a second control store which is addressed by the output of said first control store and a low performance instruction from the main memory and stores a second microprogram to form a low performance instruction.

5 Claims, 2 Drawing Figures

APPARATUS AND METHOD FOR PROCESSING MACROINSTRUCTIONS AND MICROINSTRUCTIONS

BACKGROUND OF THE INVENTION

The present invention relates to an instruction processing apparatus for executing a program stored in a main memory at the level of a microprogram.

An example of a prior instruction processing apparatus of the microprogam type is illustrated in FIG. 1. The instruction processing apparatus comprises a main memory 10, an instruction control section 12, a register section 14, and an instruction executing section 16. The main memory 10 stores a user program containing a set of so-called user instructions. User instructions read from the main memory 10 are transferred to the instruction control section 12 through a data bus 18. The instruction control section 12 comprises an instruction register 22, a control store 24, a micro sequencer 26, and a micro data register 28. The user instruction transferred from the main memory 10 to the instruction control section 12 is stored in the instruction register 22. The contents (normally, an operation code of the user instruction) in a given field of the instruction in the instruction register 22 is supplied to the control store 24 as a microaddress. Then, a microinstruction stored in an accessed address in the control store 24 is read and loaded in the micro data register 28. The microinstruction read out controls various types of hardware such as the register section 14, the instruction executing section 16, and the like. When a plurality of microinstructions are required for executing one user instruction, a microaddress is increased by the micro sequencer 26 to designate a microaddress indicating an address in which the next microinstruction is stored. The contents in a given field in a microinstruction in the micro data register 28 is transferred through a control bus 20 to the register section 14 and the instruction executing section 16, so that the user instruction is performed at the level of the microprogram.

Instruction processing apparatus of the microprogram type have been applied to a variety of fields with an improvement in the integration density of the semiconductor memory and the operation speed of the semiconductor memory used for the control store. One of the applications is to partially turn the operating system into firmware. In this application, of various functions processed by the operating system (generally by software), for example, a service program prepared in the form of subroutine, is effected by firmware or microprogram. This approach reduces the access time to the main memory, thereby improving the efficiency of the instruction processing. To this end, the use of an additional user instruction to execute a service program (consisting of a set of user instructions) of the operating system has been proposed. For discriminating the additional user instruction from the ordinary user instruction, the former will be referred to as a high performance instruction and the latter a low performance instruction. That is, the high performance instruction has the same function as that of a set of the low performance instructions. To additionally provide the high performance instruction, a set of the low performance instructions replaceable by one high performance instruction must be converted into a set of microinstructions. The conventional control store can convert a user instruction into a set of microinstructions. But it can not convert a set of user instructions into a set of microinstructions. Therefore, for additionally providing the high performance instruction, a microprogram corresponding to this instruction must also be provided additionally. This requires a redesign of the firmware, and makes it difficult to provide the additional high performance instruction.

SUMMARY OF THE INVENTION

An object of the present invention is to provide an instruction processing apparatus which allows the provision of a new user instruction with the same function as a subroutine of a software, without changing a microprogram in a control store, thus improving the efficiency of the instruction processing.

To achieve the above object of the invention, there is provided an instruction processing apparatus comprising a main memory for storing a user program containing two types of user instructions, a low performance instruction and a high performance instruction with the same function as that of a set of the low performance instructions, a discriminator for discriminating the type of user instruction read from the main memory to produce first and second outputs respectively representing a high performance instruction and a low performance instruction, a first control store for storing a first microprogram to execute a high performance instruction, the first microprogram consisting of a set of microinstructions with the same format and function as those of the low performance instruction, the first control store being addressed by the first output of the discriminator, a second control store for storing a second microprogram to execute a low performance instruction, the second control store being addressed by the second output of the discriminator and the output of the first control store, and a section for executing a user program in the main memory according to the output of the second control store.

DETAILED DESCRIPTION OF THE PREFERRED EMBODIMENT

Figure 1:
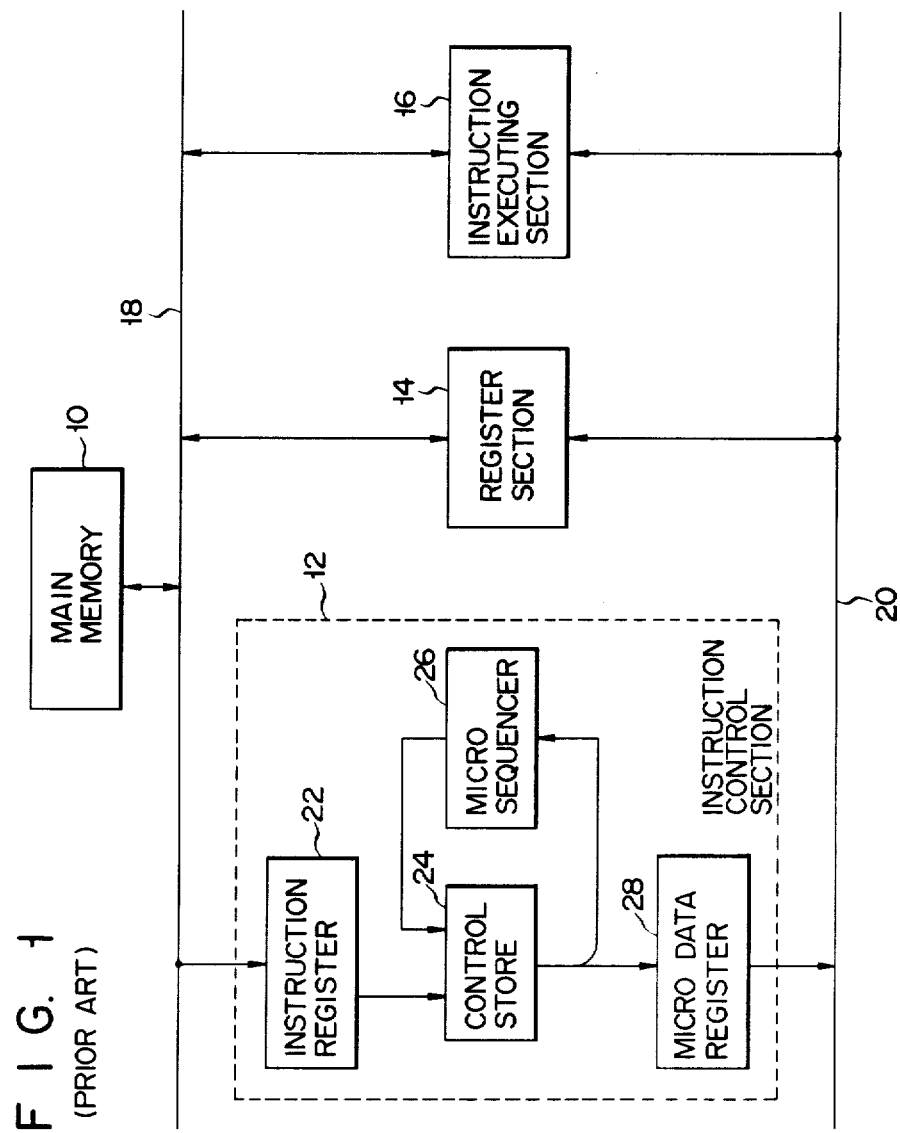
FIG. 1 shows a block diagram of a prior instruction processing apparatus of the microprogram type.
Figure 2:
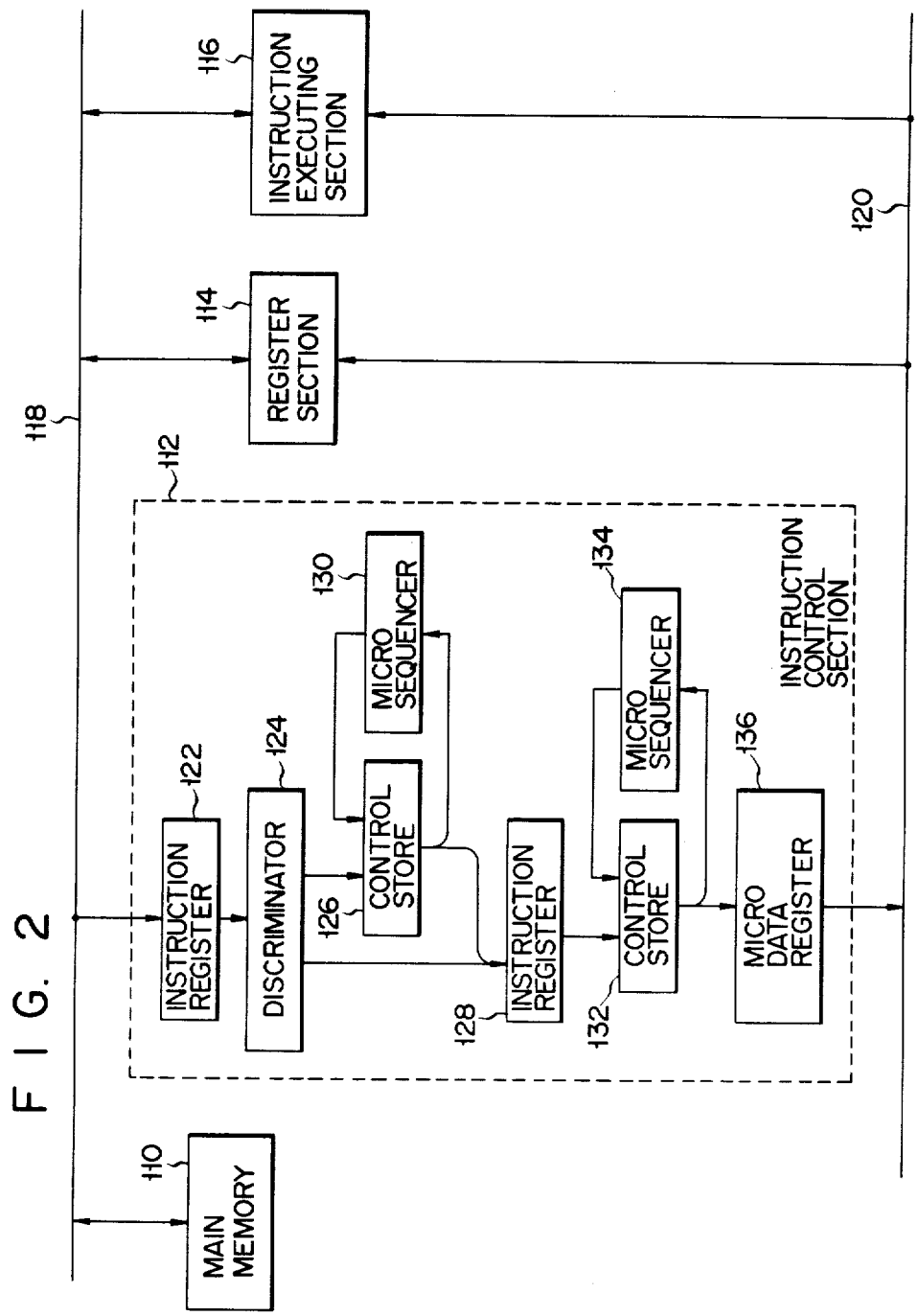
FIG. 2 is a block diagram of an embodiment of an instruction processing apparatus according to the present invention in which a part of a user program e.g. a subroutine, is turned into firmware.

A preferred embodiment of an instruction processing apparatus according to the present invention will be described referring to FIG. 2. A main memory 110, an instruction control section 112, a register section 114 and an instruction executing section 116 are connected to a data bus 118. The output signal from the instruction control section 112 is transferred through a control bus 120 to the register section 114 and the instruction executing section 116. A program stored in the main memory 110 is composed of user instructions (low performance instructions) and high performance instructions each having the same function as that of a subroutine consisting of a set of user instructions; for example, a service program of an operating system. A configuration of the instruction control section 112 follows. An instruction read out from the main memory 110 is loaded into an instruction register 122. An output instruction from the instruction register 122 is supplied to a discriminator 124 which in turn determines whether the type of instruction is a high performance instruction or a low performance instruction. When the instruction is of the high performance type, it is supplied to a first control store 126. On the other hand, when it is of the low performance type, it is supplied to an instruction register 128. The first control store 126 stores a first microprogram for realizing the high performance instruction, the first microprogram consists of microinstructions each having the same format and function as those of the low performance instruction. A micro sequencer 130 is also connected to the first control store 126. The microinstruction read from the first control store 126 is also stored in an instruction register 128. The output of the instruction register 128 is supplied to an ordinary microprogramming circuit, as shown in FIG. 1. More specifically, it is converted into a microinstruction or a set of microinstructions by a control store (second control store) 132 and a micro sequencer 134, and is stored in a micro data register 136. The second control store 132 stores a second microprogram for realizing a low performance instruction.

The operation of the embodiment thus arranged will be described. The type of instruction forming a program stored in the main memory 110 is discriminated by the contents of a given field thereof. The discriminator 124 discriminates the type of an output instruction from the instruction register 122, referring to the contents of the given field thereof. A case where this instruction is a low performance instruction will first be described. The discriminator 124 reads out a low performance instruction from the instruction register 122 and supplies it to the instruction register 128. The contents in a given field of the low performance instruction, for example, an operation code, is supplied as a microaddress to the second control store 132 so that a microinstruction is read out from the second control store 132. A microinstruction read out is loaded into the micro data register 136. The contents in a given field of the microinstruction in the micro data register 136 is transferred through the control bus 120 to the register section 114 and the instruction executing section 116, resulting in the execution of the user instruction. When a plurality of microinstructions are required for realizing the function of one low performance instruction, the micro sequencer 134 supplies to the second control store 132 a microaddress indicating a memory location of the next microinstruction. As described above, when the instruction stored in the instruction register 122 is of the low performance type, the instruction processing apparatus operates as the prior art apparatus does.

A case where the instruction stored in the instruction register 122 is a high performance instruction, will be described. The discriminator 124 makes an access to the first control store 126 with the contents in a given field, for example, an operation code, of the high performance instruction in the instruction register 122 as a microaddress. A microprogram stored in the first control store 126 is a firmware of a subroutine program which was previously provided by a software. Thus, the microprogram in the first control store 126 consists of a set of microinstructions prepared by treating the low performance instructions in the main memory 110 as the microinstructions. Since the instruction to execute this microprogram is a high performance instruction, an operation code of the high performance instruction indicates a head address of a microprogram corresponding to the high performance instruction. Therefore, when the first control store 126 is accessed, the head microinstruction of the microprogram corresponding to the high performance instruction in the instruction register 122, i.e. the head low performance instruction, is read out from the first control store 126 and is loaded into the instruction register 128. The subsequent operation is the same as those when a low performance instruction is loaded into the instruction register 122. An operation code of the low performance instruction in the instruction register 128 is supplied to the second control store 132 as a microaddress to read out the microinstruction and load it into the micro data register 136. Normally, the high performance instruction consists of a set of low performance instructions, the second and subsequent low performance instructions are read out by the micro sequencer 134 in a sequential manner. In this way, when one high performance instruction stored in the main memory 110, instead of the software program such as a service program, etc., is transferred to the instruction control section 112, a set of the low performance instructions, i.e., a set of microinstructions are read out one by one from the first control store 126. The low performance instruction as the microinstruction is supplied to the second control store 132, so that the microprogram is read out from the second control store 132 and is executed. The above operation is performed for all of the low performance instructions read out from the first control store 126, thereby to perform the high performance instruction.

As described above, in the above-mentioned embodiment, a control store (first control store 126) for storing a software program consisting of a set of user instructions as a microprogram is provided at the preceeding stage of an ordinary control store (second control store 132). This feature makes it easy to provide new user instructions. Further, a service program of an operating system prepared by a subroutine may be turned into firmware without changing the existing firmware. Consequently, the access time to the main memory is reduced improving the efficiency of instruction processing.

What we claim is:

1. An apparatus for performing selected tasks comprising:

main memory means for storing instructions in the form of digital signals specifying tasks to be performed, said stored digital signals including at least one of a high performance instruction specifying a task and a plurality of low performance instructions each specifying a subtask, said task specified by said high performance instruction performable by performing the subtasks specified by at least one of said plurality of low performance instructions, each of said low performance instructions having a predetermined format;

first control storing means for storing a first microprogram comprising a plurality of microinstructions specifying subtasks corresponding to said subtasks specified by said plurality of low performance instructions, said microinstructions of said first microprogram having said predetermined format;

second control storing means for storing a second microprogram including a plurality of microinstructions each specifying a microtask, each of said subtasks performable by performing at least one of said microtasks;

first reading means for reading an instruction stored in said main memory means;

means for determining whether the instruction read by said first reading means is said high performance instruction;

second reading means for reading at least part of said first microprogram stored in said first control storing means in response to a determination by said determining means that said instruction read by said first reading means is said high performance instruction;

third reading means for alternately (1) reading microinstructions from said second control storing means specifying the microtasks which, when performed, perform the subtasks specified by said first microprogram read by said second reading means and (2) reading microinstructions from said second control storing means specifying microtasks which, when performed, perform said subtasks specified by said instruction read by said first reading means; and means for performing the microtasks specified by the microinstructions read by said third reading means.

2. An apparatus as in claim 1 wherein said determining means includes means for testing the contents of a predetermined field of the instruction read from said main memory means by said first reading means.

3. An apparatus as in claim 1 wherein said second reading means includes:

second determining means for determining, in response to a determination by said first determining means that the instruction read by said first reading means is a high performance instruction, the contents of a predetermined field of said read high performance instruction;

means for reading an initial one of said microinstructions stored in said first control store means, said initial one being specified by said determined contents; and means for sequentially reading microinstructions of said first microprogram in a predetermined order beginning at said initial microinstruction.

4. An apparatus as in claim 1 wherein said third reading means includes:

instruction register means for storing the microinstructions read by said second reading means;

means for determining the contents of a predetermined field of said microinstructions stored in said instruction register means;

means, operatively connected to said contents determining means, for reading an initial one of the microinstructions of said second microprogram from said second control store means, said initial one specified by said determined contents; and means for sequentially accessing microinstructions of said second microprogram in a predetermined order beginning at said initial microinstruction.

5. A method of processing digital signals comprising the steps of:

(1) storing instructions in the form of digital signals in a main memory, said digital signals specifying tasks to be performed, said stored digital signals including at least one of a high performance instruction specifying a task and a plurality of low performance instructions each specifying a subtask, said task specified by said high performance instruction performable by performing the subtasks specified by said plurality of low performance instructions, each of said low performance instructions having a predetermined format;

(2) storing, in a first control store, a first microprogram comprising a plurality of microinstructions specifying subtasks corresponding to said subtasks specified by a plurality of low performance instructions, said microinstructions of said first microprogram having said predetermined format;

(3) storing, in a second control store, a second microprogram including a plurality of microinstructions each specifying a microtask, each of said subtasks performable by performing at least one of said microtasks;

(4) reading an instruction stored in said main memory;

(5) determining whether the instruction read by said reading step (4) is said high performance instruction;

(6) if said determining step (5) determines the instruction read by said reading step (4) is said high performance instruction, performing the following steps:

(a) reading at least part of said first microprogram from said first control store;

(b) reading the microinstructions from said second control store specifying the microtasks which, when performed, perform the subtasks specified by said first microprogram read by said reading step (6a); and (c) performing said microtasks specified by the microinstructions read by said reading step (6b); and (7) if said determining step (5) determines that the instruction read by said reading step (4) is a low performance instruction, performing the steps of:

(a) reading, from said second control store, the microinstructions specifying microtasks which, when performed, perform said subtasks specified by said instruction read by said reading step (4); and (b) performing said microtasks specified by the microinstructions read by said reading step (7a).

* * * * *